Sheet 1, 2 Sheets.
J. W. Jordan.
BEST AVAILABLE COPY
Side Hill Plow.
No. 9210 X
Patented Oct. 28, 1835.
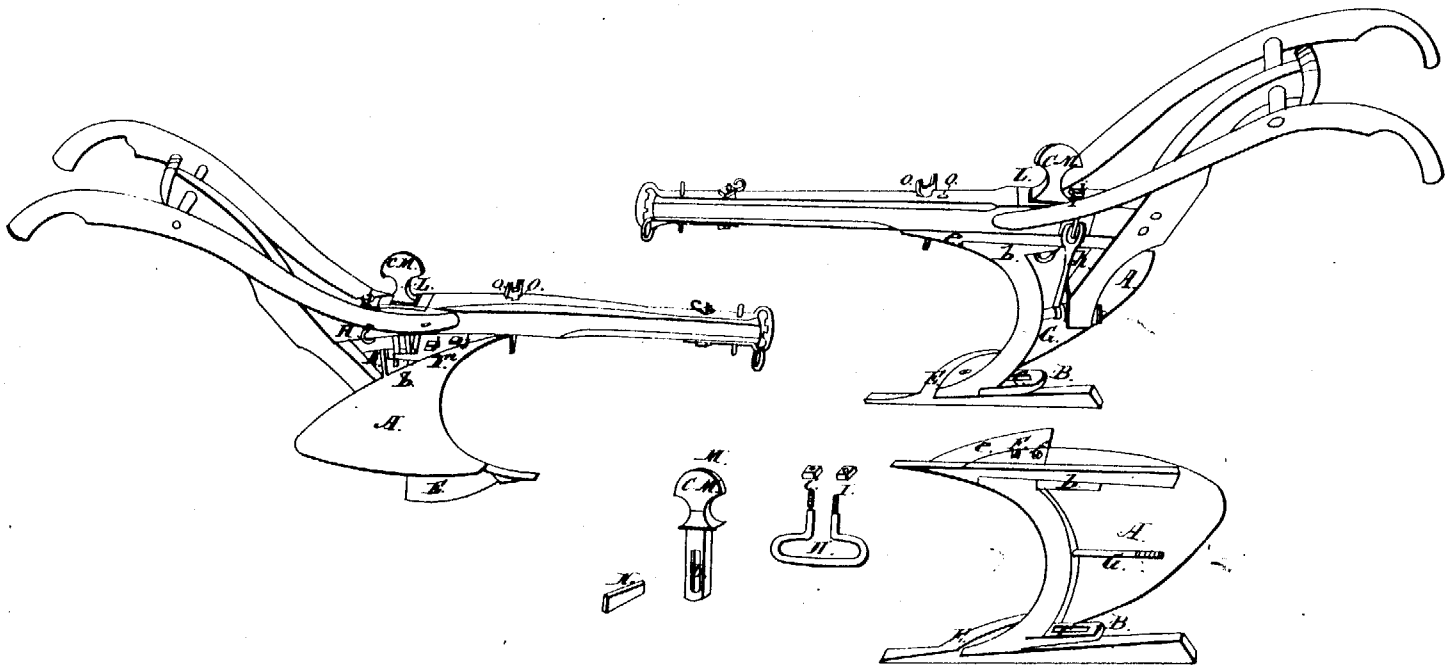
H. PETERS, PHOTO-LITHOGRAPHER, WASHINGTON, D. C.

Sheet 2, 2 Sheets.
J. W. Jordan.
BEST AVAILABLE COPY
Side Hill Plow.
No. 9210 X
Patented Oct. 28, 1835.
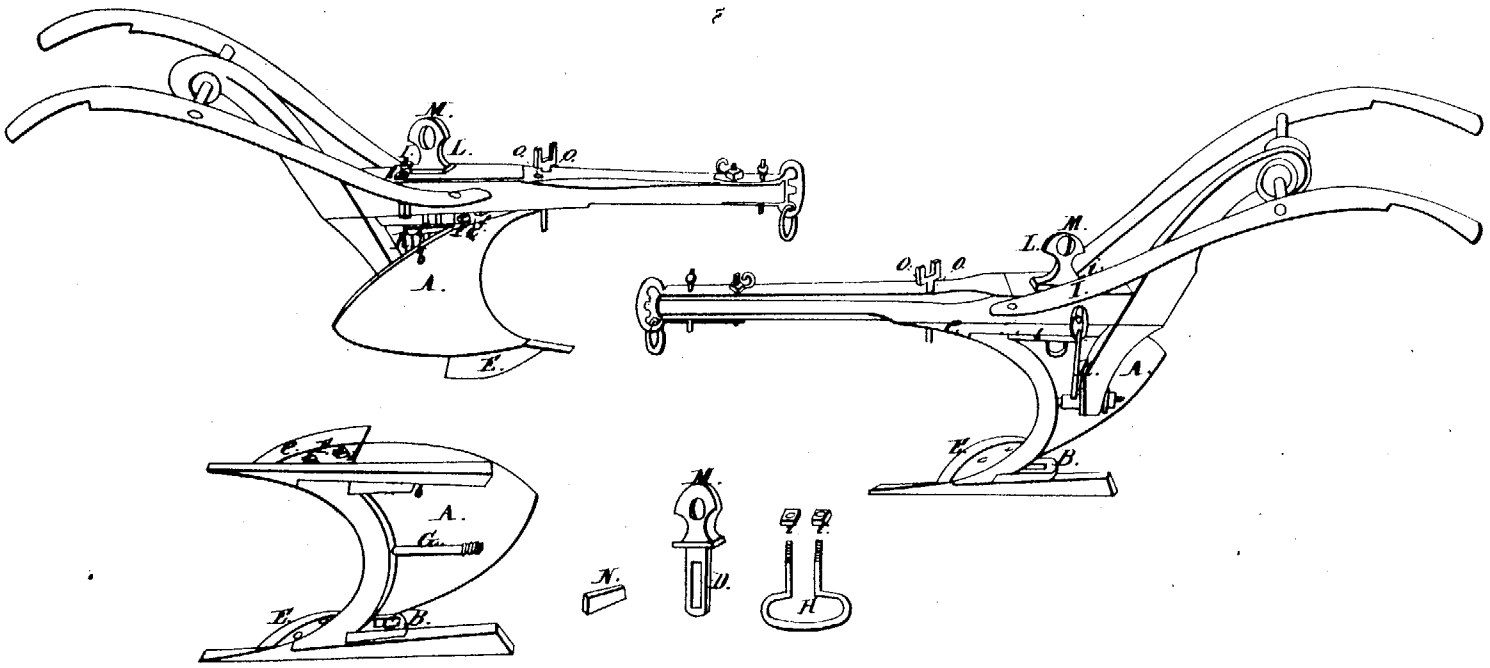
H. PETERS, PHOTO-LITHOGRAPHER, WASHINGTON, D. C.

9210X Oct. 28. 1835

John W. Jordan.

The Schedule referred to in these Letters Patent and making part of the same containing a description in the words of the said John W. Jordan himself, of his Improvement in the Inverting Hill Side and Horizontal Plough.

Be it Known that I. John W. Jordan of the County of Rockbridge, in the State of Virginia have made an Improvement in the Plough" called Jordans inverting hillside and horizontal Plough, which is described as follows: reference being had to the annexed drawings of the same, making part of this Specification.—

The general appearance of the wood work of this plough resembles that of the common shovel plough, the fixtures and fastenings thereto being entirely new. The mould board is a concave plate of cast metal, marked A. in the annexed drawings resembling in appearance a figure that would be formed by uniting two mould boards of the McCormick pattern (a right and left hand) by their upper edges. At the hinder part of the mould boards are two projections B.b. called the heels, these are about 4 inches long 3 inches wide, and 1 inch thick having a mortise or crotch c. of a suitable size to receive a tenon or key passing through the beam having a mortise D. in the same. The mortise or crotch in the heel is made a little angling, so as to throw the point of the plough to the land. The shears and landsides E.e. are made of wrought iron and steel, & fastened to the mould board by two screws F.f. in each. The upright part of the land side and screwbolt of the common plough are dispensed with. G. is a rod or pivot passing through the centre of the mould board and through the shaft behind and secured by a screw or key, on which rod the plough revolves, and by which it is inverted at pleasure. The rod may be cast to the mould board, or made separate of wrought iron and fastened to the mould board. H. is a staple let into the under side of the beam corresponding with the plane of its lower side, and extending out beyond each side of the beam far enough to let the rod K. pass out of the way of the shears in coming to their

9210X places under the beam, the staple is secured to the beam by screws and nuts I.i. resting on a plate on the top of the beam. K. the upright rod extending from the horizontal rod or pivot G. to the staple H. it is connected to the rod G. by an eye through which the rod G. passes; the connection with the staple H. may be by a similar eye or by a hook, both ends must be fitted so loosely that they will slip from side to side of the plough, when reversing it.

L. is a mortise made through the beam of the same size, as the mortises or crotches in the heel of the mould board, and perpendicular to them; the upper and under sides of the beam where this mortise is cut ought to be shod with iron plates let into the beam, to the level of the wood and secured by screws or nails. M. an iron tenon or key with a shoulder having a mortice through the tenon to receive a strong key or wedge N. The tenon M. is to be of a size to correspond with the mortise in the beam and the mortises in the heels of the mould board, and of such length as to extend thro' the mortise in the beam and heel of the mould board, and to receive the strong wooden key on the lower side of the heels.

This tenon when introduced through these mortises, and well fastened by the key N. secures the mould board to its proper position for work. O.O. Two perpendicular holes situated between the point and edge of the shear, these holes are intended to receive the small end of the screw driver, which must extend through the beam far enough for the side of the point of the plough to bear against it; this will serve to bear the plough against the land, and aid it in maintaining its position.

In ploughing on the side of a hill, and a furrow being cut to the end of the land, the pin in the mortise of the tenon, is drawn out the tenon raised and the pin inserted above the beam; the screw driver is also removed, the mould board is turned on the rod or pivot and its position reversed; the tenon is then dropped into the mortise in the beam and into the mortise in the other heel and keyed fast; the screw driver inserted into the other hole in the beam and the plough is ready for cutting another furrow on its return, which will be thrown down hill in the same direction as the former one, the time required for reversin[g]

the mould board being not more than half a minute. The plough may be strengthened so as to be used in road making or otherwise by welding a brace from the rod to the tail of the mould board, or from the heel of the land bar to the rod.

What I claim as my own invention and not previously known, is the combination and arrangement of the parts of the before described plough; but I particularly claim the form of the mould board, and the manner of reversing it, though I make no claim to the principle of revolving mould Boards.

Witnesses
Wm. P. Elliot
Sam Stettinens

Jnt. W. Jordan (Drawing).

[936 wds] [E.R.Gl.]